K. CHMUROWICZ.
NUTCRACKING DEVICE.
APPLICATION FILED AUG. 9, 1911.
1,005,692.
Patented Oct. 10, 1911.
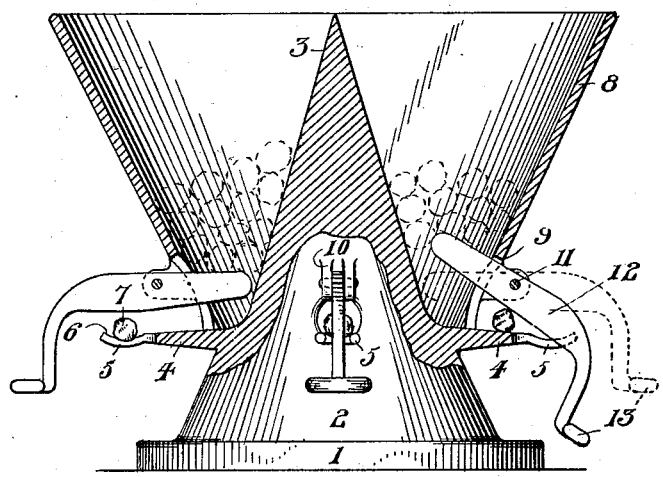
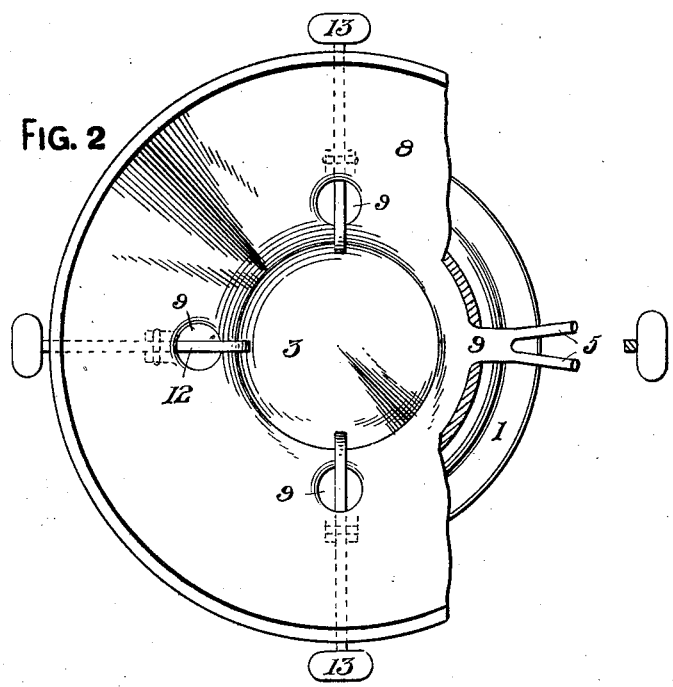

1,005,692. NUTCRACKING DEVICE. Karol Chmurowicz, Chester, N. Y. Filed Aug. 9, 1911. Serial No. 643,116.

*To all whom it may concern:*

Be it known that I, KAROL CHMUROWICZ, a subject of the Emperor of Austria-Hungary, residing at Chester, in the county of New York and State of New York, have invented certain new and useful Improvements in Nutcracking Devices, of which the following is a specification, reference being had therein to the accompanying drawing.

This invention relates to nut cracking devices, and the primary object of my invention is to provide a table fixture for holding nuts that can be easily cracked from different sides of the fixture.

Another object of this invention is to furnish a nut cracking device with cracking levers that control the feeding of nuts from the receptacles or container of the device.

A further object of this invention is to provide a nut cracking device that is simple in construction, durable, and susceptible to any desired ornamentation.

I attain the above objects by a mechanical construction that will be hereinafter specifically described and then claimed.

Reference will now be had to the drawing; wherein—

Figure 1 is a side elevation of the device partly broken away and partly in section, and Fig. 2 is a plan of the device partly broken away and partly in section.

A device in accordance with this invention comprises a flat circular base, and formed integral with this base is a conical shaped support 2, having the upper end thereof reduced to provide a deflector 3. At the juncture of the support 2 and the deflector 3 there are a plurality of radially disposed horizontal arms 4, having the outer ends thereof bifurcated or forked, as at 5, and provided with seats 6, for nuts 7.

The nuts 7 are held within a funnel shaped reservoir or container 8 formed integral with the support 2, and provided with openings 9 adjacent to each of the arms 4. The walls of the openings 9 have outwardly extending apertured lugs 10, and pivotally mounted between these lugs by pins 11 are cracking levers 12. The inner ends of the levers extend into the container 8, and the outer ends thereof extend beyond the arms 4 and are provided with finger pieces 13.

The nuts within the container 8 normally retain the cracking levers in a horizontal position and when the inner end of one of said levers is raised a nut is released to fall through the opening 9 on to the bifurcated end of the arm. By then raising the outer end of the lever, the nut can easily pass on to the end of the arm, and then by striking the outer end of the lever a blow, or otherwise bringing pressure to bear upon the same, the shell of the nut will be cracked and the corners and pieces of the shell fall through the bifurcation of the arm.

The device in its entirety is made of strong and durable metal and of various sizes.

What I claim is:

1. A nut cracking device comprising a support, a conical shaped container carried by said support and having the walls thereof provided with openings, radially disposed arms carried by said support and adapted to receive nuts from said container, and cracking levers pivotally supported by said container and having the inner ends thereof extending through the openings of said container.

2. A nut cracking device comprising a support, a conical shaped container carried by said support and having the walls thereof provided with openings, radially disposed arms carried by said support and adapted to receive nuts from said container, crank levers pivotally supported by said container and having the inner ends thereof extending through the openings of said containers, and a conical shaped deflector arranged in said container.

3. A nut cracking device comprising a support, a conical shaped deflector carried thereby, a funnel shaped container surrounding said deflector and having openings at the base thereof, bifurcated arms carried by said support adjacent to said opening, pivoted cracking levers carried by said container and adapted to crack nuts upon said arms and finger pieces carried by the outer ends of said levers.

In testimony whereof I affix my signature in the presence of two witnesses.

KAROL CHMUROWICZ.

Witnesses:
JUSTUS E. MURRAY,
JOHN P. BULL.